US009110967B2

(12) United States Patent
Halberstadt

(10) Patent No.: US 9,110,967 B2
(45) Date of Patent: Aug. 18, 2015

(54) DATA LINEAGE IN DATA WAREHOUSING ENVIRONMENTS

(75) Inventor: Benjamin Halberstadt, Jerusalem (IL)

(73) Assignee: International Business Machines Corporation, Armonk, CA (US)

( * ) Notice: Subject to any disclaimer, the term of this patent is extended or adjusted under 35 U.S.C. 154(b) by 2355 days.

(21) Appl. No.: 11/847,035

(22) Filed: Aug. 29, 2007

(65) Prior Publication Data

US 2009/0063534 A1 Mar. 5, 2009

(51) Int. Cl.

| | |
|---|---|
| ***G06F 7/00*** | (2006.01) |
| ***G06F 17/00*** | (2006.01) |
| ***G06F 17/30*** | (2006.01) |
| ***G06F 17/40*** | (2006.01) |

(52) U.S. Cl.

CPC .......... *G06F 17/30592* (2013.01); *G06F 17/40* (2013.01)

(58) Field of Classification Search

CPC ........................... G06F 17/30592; G06F 17/40

USPC ........................................... 707/804, 999.102

See application file for complete search history.

(56) References Cited

U.S. PATENT DOCUMENTS

| | | | | |
|---|---|---|---|---|
| 7,725,433 | B1 * | 5/2010 | Labrie | 707/612 |
| 2005/0187991 | A1 | 8/2005 | Wilms et al. | |
| 2006/0271528 | A1 * | 11/2006 | Gorelik | 707/999.003 |

FOREIGN PATENT DOCUMENTS

WO WO2007005732 A2 1/2007

OTHER PUBLICATIONS

A.S. de Santana et al, “Metadata to support transformations and data & metadata lineage in a warehousing environment”, Data Warehousing and Knowledge Discovery. 6th International Conference, DaWaK 2004. Proceedings, Sep. 1-3, 2004, Zaragoza, Spain.

* cited by examiner

*Primary Examiner* — Charles Lu

(74) *Attorney, Agent, or Firm* — Steven M. Greenberg, Esq.; CRGO Law

(57) ABSTRACT

A system for providing data lineage information for data warehouse objects, the system including a plurality of job descriptions, a log for recording operational information of any of the jobs when any of the jobs are run, a plurality of schemas of databases accessed by the jobs, and a binding service configured to combine information from the job descriptions, the log, and the schemas to provide a data lineage for a data object of a data warehouse.

13 Claims, 5 Drawing Sheets

```
ETL Jobs:
    Job245
    Runtime parameters: InputDatabase, InputRowStart, InputRowEnd,
OutputDestination
    Begin
            Read(InputDatabase, InputRowStart, InputRowEnd) into Buffer
            Sum Column1 of Buffer
            Write Sum to OutputDestination
    EndJob245

    Job546
    Runtime parameters: InputDatabase, InputRowStart, InputRowEnd,
            OutputDatabase
    Begin
            Read(InputDatabase, InputRowStart, InputRowEnd) into Buffer
            Write Buffer to OutputDatabase
    EndJob546
```

Fig. 2

```
LogFile:
    Job546
    Start:5.8.07 20:32 End: 5.8.07 20:38
    Read: NorthernRegionData, rows 20-45
    Wrote: ConsolidatedData, rows 50-75

    Job546
    Start:5.8.07 21:17 End: 5.8.07 21:25
    Read: SouthernRegionData, rows 10-35
    Wrote: ConsolidatedData, rows 76-100

    Job245
    Start:5.8.07 22:45 End: 5.8.07 23:07
    Read: ConsolidatedData, rows 50-100
    Wrote: GrossSales
EndLogFile
```

Fig. 3

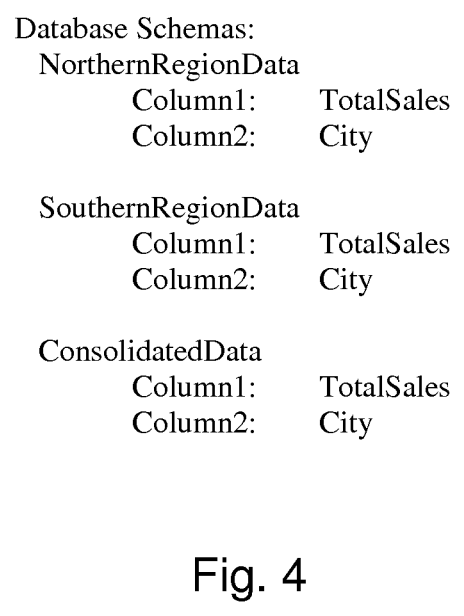

Database Schemas:
NorthernRegionData
Column1: TotalSales
Column2: City

SouthernRegionData
Column1: TotalSales
Column2: City

ConsolidatedData
Column1: TotalSales
Column2: City

Fig. 4

```
Data Lineage Report for: GrossSales

Job546
Start:5.8.07 20:32 End: 5.8.07 20:38
Read: NorthernRegionData, rows 20-45
    Read(NorthernRegionData,FromRow20,ToRow45) into Buffer
            where NorthernRegionData is made up of:
                    Column1:    TotalSales
                    Column2:    City
Wrote: ConsolidatedData, rows 50-75
    Write Buffer to ConsolidatedData
            where ConsolidatedData is made up of:
                    Column1:    TotalSales
                    Column2:    City
EndJob546

Job546
Start:5.8.07 21:17 End: 5.8.07 21:25
Read: SouthernRegionData, rows 10-35
    Read(SouthernRegionData,FromRow10,ToRow35) into Buffer
            where SouthernRegionData is made up of:
                    Column1:    TotalSales
                    Column2:    City
Wrote: ConsolidatedData, rows 76-100
    Write Buffer to ConsolidatedData
            where ConsolidatedData is made up of:
                    Column1:    TotalSales
                    Column2:    City
EndJob546

Job245
Start:5.8.07 22:45 End: 5.8.07 23:07
Read: ConsolidatedData, rows 50-100
    Read(ConsolidatedData,FromRow50,ToRow100) into Buffer
            where ConsolidatedData is made up of:
                    Column1:    TotalSales
                    Column2:    City
    Sum Column1 of Buffer
            where Column1 of Buffer = Column1 of ConsolidatedData = TotalSales
Wrote: GrossSales
    Write Sum to DataWarehouse:GrossSales
EndJob245

EndReport
```

Fig. 5

DATA LINEAGE IN DATA WAREHOUSING ENVIRONMENTS

FIELD OF THE INVENTION

The present invention relates to data warehouses in computing environments in general, and in particular to providing data lineage information for data stored in a data warehouse.

BACKGROUND OF THE INVENTION

Data warehousing systems typically collect data from multiple distributed data sources and store integrated and summarized information in local databases for efficient reporting, analysis or data mining. Often when using the data in a data warehouse, it is useful to identify the source data from which some particular data warehouse item was derived. For a given data warehouse item, the source or sources that were used to produce the data warehouse item and what and how other data were transformed to produce it is known as the data lineage of the data warehouse item.

In one approach to providing the data lineage of a data warehouse item, as each data item is loaded into the data warehouse the identity of the source of the data item is recorded. Unfortunately, documenting the source of the data item does not provide information regarding what and how other data were transformed to produce it. Furthermore, identifying the source is often a recursive problem, since the direct source of the data warehouse item may draw its information from another source, and so on, defining a path from source to source, often across numerous systems, until one or more root sources of data has been identified. And where the systems along the source path are developed at different times by different entities using different technologies, identifying the source path may be difficult.

In another approach the software jobs that are run to extract, transform, and load data into the data warehouse are analyzed to determine how data are read, filtered, translated, aggregated, and otherwise transformed and written. By examining these jobs the source data of a data warehouse item may be inferred. However, these jobs, which typically number in the dozens or hundreds, are often designed to be used with data sources whose identities only become known to the jobs at runtime, and thus the identity of the sources are not hard-coded into the job. Furthermore, these jobs often include logic that controls the flow of data based on conditions that exist as the job is run, and such conditions cannot be determined by examining a job design. Thus, attempting to determine data lineage from such an examination would require taking into account all possible data flow paths within a job, resulting in multiple possible lineages for any given data warehouse item, rather than a single true lineage.

SUMMARY OF THE INVENTION

The present invention provides data lineage information for data warehouse data by binding design time information, which describes data flows and transformations, operational logs, which tracks actual data reads and writes, and database schema, which describe the data.

In one aspect of the present invention a system is provided for providing data lineage information for data warehouse objects, the system including a plurality of job descriptions, a log for recording operational information of any of the jobs when any of the jobs are run, a plurality of schemas of databases accessed by the jobs, and a binding service configured to combine information from the job descriptions, the log, and the schemas to provide a data lineage for a data object of a data warehouse.

In another aspect of the present invention the job descriptions include design time information which describes data flows and transformations of the data.

In another aspect of the present invention the log includes records of data reads and writes.

In another aspect of the present invention the log includes records of when any of the jobs started and ended, what database any of the jobs read data from, and to which database any of the jobs wrote data.

In another aspect of the present invention any of the job descriptions, the log, and the schemas are stored in a data store that is accessible to a computer, where the binding service is embodied as any of computer hardware and computer software on a computer-readable medium, and where the computer is configured with the binding service.

In another aspect of the present invention a method is provided for providing data lineage information for data warehouse objects, the method including maintaining a plurality of job descriptions, maintaining a log for recording operational information of any of the jobs when any of the jobs are run, maintaining a plurality of schemas of databases accessed by the jobs, and combining information from the job descriptions, the log, and the schemas to provide a data lineage for a data object of a data warehouse.

In another aspect of the present invention the maintaining a plurality of job descriptions includes maintaining design time information which describes data flows and transformations of the data.

In another aspect of the present invention the maintaining a log includes maintaining records of data reads and writes.

In another aspect of the present invention the maintaining a log includes maintaining records of when any of the jobs started and ended, what database any of the jobs read data from, and to which database any of the jobs wrote data.

In another aspect of the present invention a computer program is provided embodied on a computer-readable medium, the computer program including a first code segment operative to maintain a plurality of job descriptions, a second code segment operative to maintain a log for recording operational information of any of the jobs when any of the jobs are run, a third code segment operative to maintain a plurality of schemas of databases accessed by the jobs, and a fourth code segment operative to combine information from the job descriptions, the log, and the schemas to provide a data lineage for a data object of a data warehouse.

In another aspect of the present invention the first code segment is operative to maintain design time information which describes data flows and transformations of the data.

In another aspect of the present invention the second code segment is operative to maintain records of data reads and writes.

In another aspect of the present invention the second code segment is operative to maintain records of when any of the jobs started and ended, what database any of the jobs read data from, and to which database any of the jobs wrote data.

BRIEF DESCRIPTION OF THE DRAWINGS

The present invention will be understood and appreciated more fully from the following detailed description taken in conjunction with the appended drawings in which:

FIG. 2 are sample job descriptions useful in understanding the present invention;

FIG. 3 are sample log entries useful in understanding the present invention;

FIG. 4 are sample schema descriptions useful in understanding the present invention; and FIG. 5 is a sample data lineage description useful in understanding the present invention.

DETAILED DESCRIPTION OF THE INVENTION

Figure 1A:
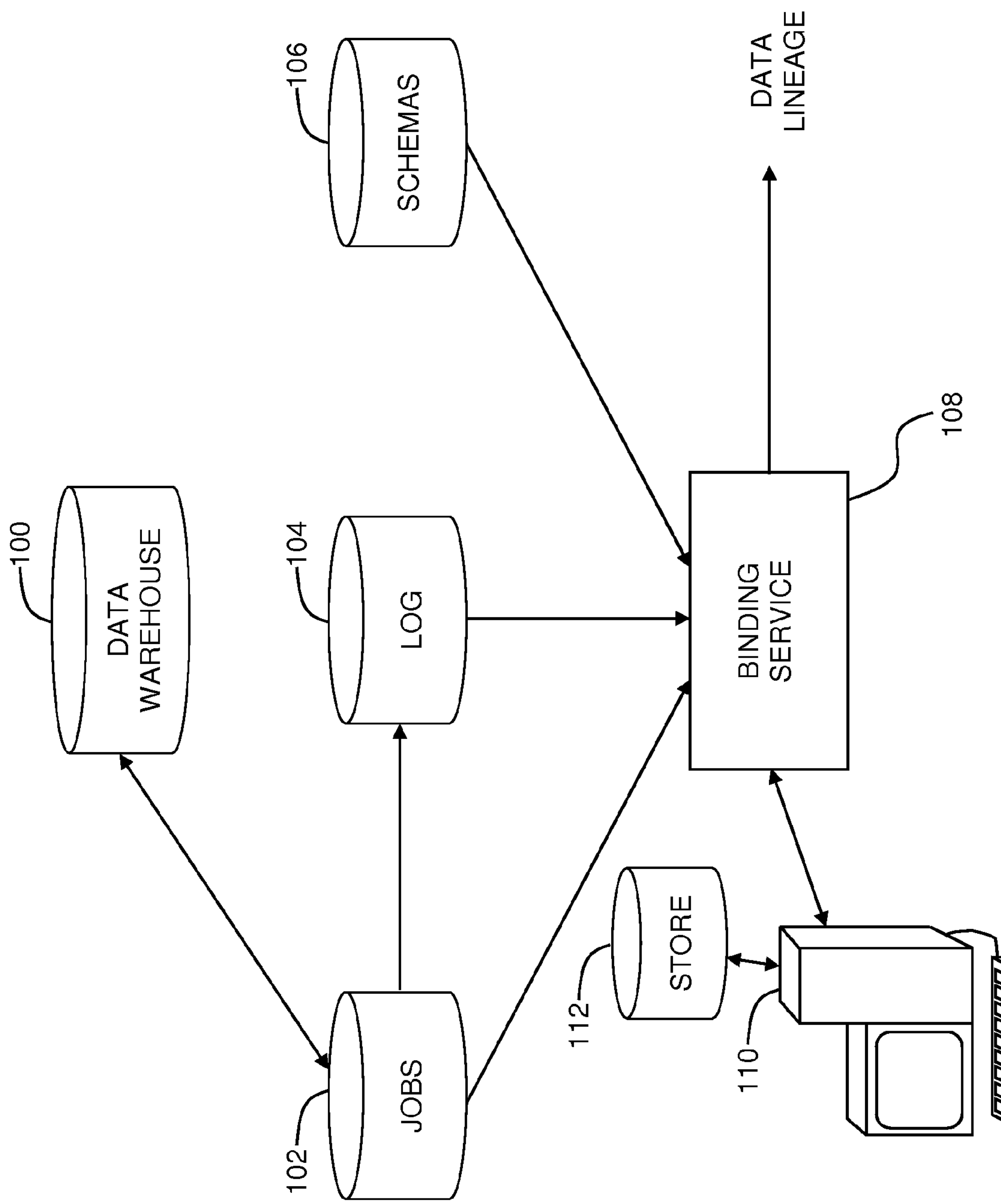
FIG. 1A is a simplified conceptual illustration of system for providing data lineage information for data warehouse objects, constructed and operative in accordance with an embodiment of the present invention.
Figure 1B:
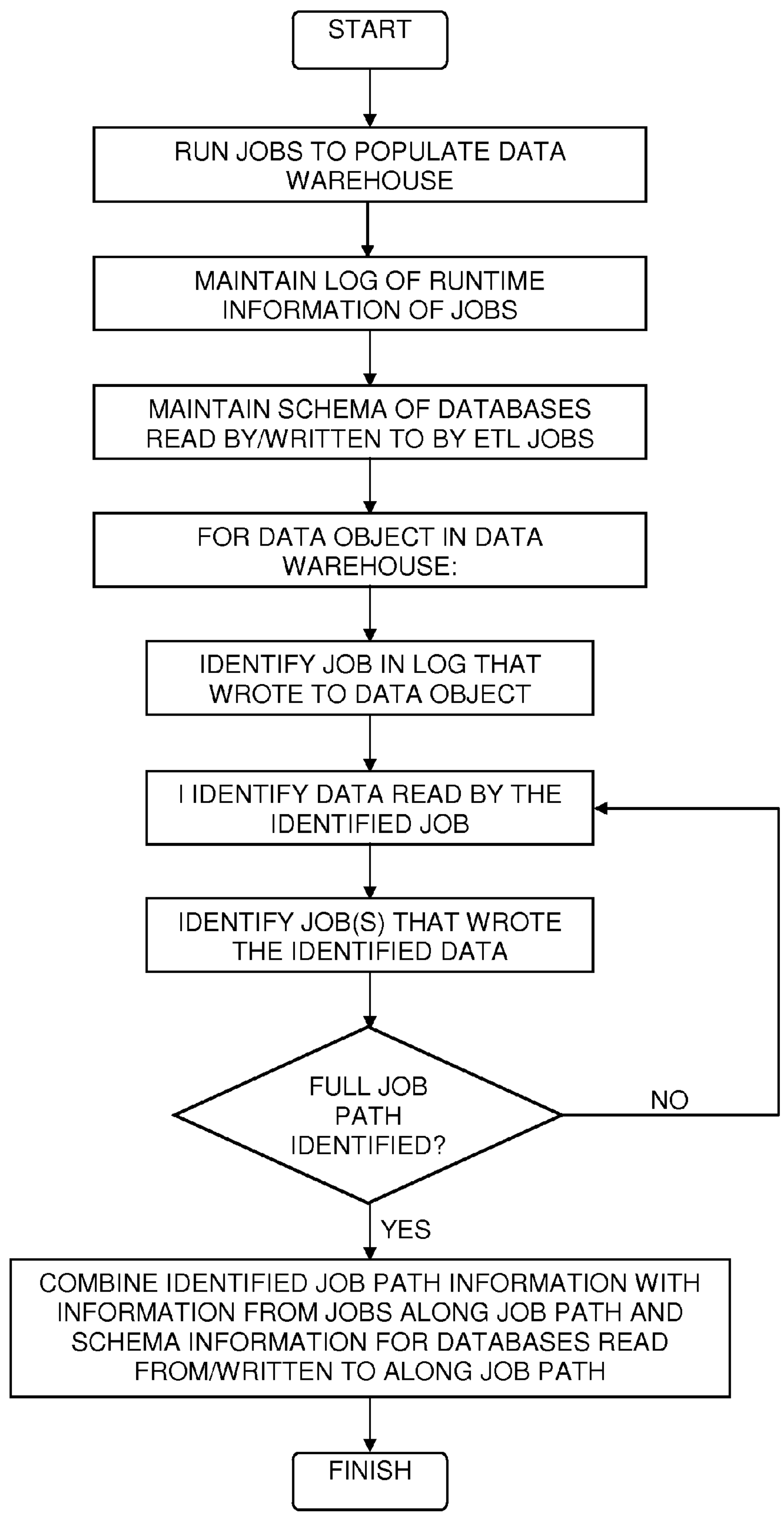
FIG. 1B is a simplified flowchart illustration of an exemplary method of operation of the system of FIG. 1A, operative in accordance with an embodiment of the present invention.

Reference is now made to FIG. 1A, which is a simplified conceptual illustration of system for providing data lineage information for data warehouse objects, constructed and operative in accordance with an embodiment of the present invention, and additionally to FIG. 1B, which is a simplified flowchart illustration of an exemplary method of operation of the system of FIG. 1A, operative in accordance with an embodiment of the present invention. In the system of FIG. 1A and method of FIG. 1B a data warehouse 100 is populated by one or more jobs 102, such as extract, transform, and load (ETL) jobs well-known in the data warehousing arts. Jobs 102 may refer by name to specific databases and fields, or may be designed for use with different databases whose names and fields are known to jobs 102 at runtime. For example, FIG. 2 shows two sample jobs named Job245 and Job546, where each job receives the name of the database on which the job is to operate, among other database-specific information, as parameters that are passed to the job at runtime. It will be seen, however, that examining Job245 and Job546 gives no indication of what databases each job accesses. A log 104 is also kept in which operational information is recorded when any of jobs 102 are run. For example, FIG. 3 shows a sample log indicating that Job546 was run twice and Job245 once, when each job started and ended, what database each job read data from, and to which database each job wrote data. It will be seen, however, that examining log 104 gives no indication whether and how the data was transformed. One or more database schemas 106 describing the databases accessed by jobs 102 are also provided. For example, FIG. 4 shows schemas for the databases read from and/or written to by Job245 and Job546.

A binding service 108 is provided which combines information from jobs 102, log 104, and schemas 106 to provide data lineage information for a data object of data warehouse 100. For example, the data lineage of the GrossSales object of data warehouse 100 may be expressed by binding service 108 as shown in FIG. 5 by identifying a) which job in log 104 wrote to GrossSales, b) what data was read by that job, and c) which other job 104 wrote that data. Steps b) and c) may be performed recursively along one or more paths within log 104 as required until one or more jobs are arrived at whose data sources are not traceable within log 104 to other jobs. The identified job path may then be combined with information from the jobs 102 that are traversed along the job path, such as job commands or other job metadata, as well as with information regarding the schemas 106 referred to by log 104. Where database names and other database parameters are passed to a job along the job path, they may be inserted into the lineage in place of the job parameter variables. Thus, in the example in FIG. 5, the parameters InputDatabase, InputRowStart, InputRowEnd, and OutputDestination of Job245 may be replaced with ConsolidatedData, FromRow50, ToRow100, and GrossSales as indicated by log 104.

Any of the elements of the invention referred to herein may be stored on, executed by, and/or otherwise managed by one or more computers 110 having access to a data store 112 which may be a magnetic memory and/or any other known data storage device.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for providing data lineage information for data warehouse objects, the system comprising:
- a data warehouse populated by
  - a plurality of job descriptions describing jobs operating on data warehouse objects;
  - a log for recording operational information of any of said jobs when any of said jobs are run;
  - a plurality of schemas of databases accessed by said jobs; and
- a hardware data processing device providing a binding service configured to combine information from said job descriptions, said log, and said schemas to provide a data lineage for a data object of the data warehouse, wherein during combining job parameter variables within the job descriptions are replaced with database specific information obtained from the log.

2. The system according to claim 1 wherein said job descriptions include design time information which describes data flows and transformations of said data.

3. The system according to claim 1 wherein said log includes records of data reads and writes.

4. The system according to claim 1 wherein said log includes records of when any of said jobs started and ended, what database any of said jobs read data from, and to which database any of said jobs wrote data.

5. The system according to claim 1 wherein any of said job descriptions, said log, and said schemas are stored in a data store that is accessible to the hardware data processing device, wherein said binding service is embodied as any of computer hardware and computer software on a computer-readable storage medium, and wherein said hardware data processing device is configured with said binding service.

6. A method for providing data lineage information for data warehouse objects, the method comprising:
- maintaining a plurality of job descriptions describing jobs operating on data warehouse objects;
- maintaining a log for recording operational information of any of said jobs when any of said jobs are run;
- maintaining a plurality of schemas of databases accessed by said jobs; and combining, by a binding service provided by a hardware data processing device, information from said job descriptions, said log, and said schemas to provide a data lineage for a data object of a data warehouse, wherein during combining job parameter variables within the job descriptions are replaced with database specific information obtained from the log.

7. The method according to claim 6 wherein said maintaining the plurality of job descriptions comprises maintaining design time information which describes data flows and transformations of said data.

8. The method according to claim 6 wherein said maintaining the log includes maintaining records of data reads and writes.

9. The method according to claim 6 wherein said maintaining the log includes maintaining records of when any of said jobs started and ended, what database any of said jobs read data from, and to which database any of said jobs wrote data.

10. A computer program embodied on a computer-readable storage medium, the computer program comprising:

a first code segment operative to maintain a plurality of job descriptions describing jobs operating on data warehouse objects within a data warehouse;

a second code segment operative to maintain a log for recording operational information of any of said jobs when any of said jobs are run;

a third code segment operative to maintain a plurality of schemas of databases accessed by said jobs; and a fourth code segment operative to enable a binding service within a hardware data processing device to combine information from said job descriptions, said log, and said schemas to provide a data lineage for a data object of a data warehouse, wherein during combining job parameter variables within the job descriptions are replaced with database specific information obtained from the log.

11. The computer program according to claim 10 wherein said first code segment is operative to maintain design time information which describes data flows and transformations of said data.

12. The computer program according to claim 10 wherein said second code segment is operative to maintain records of data reads and writes.

13. The computer program according to claim 10 wherein said second code segment is operative to maintain records of when any of said jobs started and ended, what database any of said jobs read data from, and to which database any of said jobs wrote data.

* * * * *